United States Patent [19]

Kiefer

[11] Patent Number: 4,565,513
[45] Date of Patent: Jan. 21, 1986

[54] APPARATUS FOR SHAPING AND CUTTING A THIN THERMOPLASTIC SHEET TO MAKE ARTICLES AND FOR STACKING THE ARTICLES

[75] Inventor: Günther Kiefer, Schwaigern, Fed. Rep. of Germany

[73] Assignee: Adolf Illig Maschinenbau GmbH & Co., Heilbronn, Fed. Rep. of Germany

[21] Appl. No.: 614,782

[22] Filed: May 29, 1984

[30] Foreign Application Priority Data

May 28, 1983 [DE] Fed. Rep. of Germany ....... 3319473
Dec. 23, 1983 [DE] Fed. Rep. of Germany ....... 3346628

[51] Int. Cl.$^4$ .................. B29C 17/03; B29C 17/10
[52] U.S. Cl. ................................ 425/289; 425/298; 425/398
[58] Field of Search ............... 425/289, 145, 527, 298, 425/292, 383, 384, 388, 387.1, 405 R, 306, 316, 346, 351, 407, 412, 422, 302.1, 398; 264/550, 551; 72/448, 427

[56] References Cited

U.S. PATENT DOCUMENTS

| 3,081,491 | 3/1963 | Black ................................. | 425/387.1 |
| 3,189,399 | 6/1965 | Jacobs et al. ..................... | 425/302.1 |
| 3,802,819 | 4/1974 | Alroy ................................ | 425/387.1 |
| 3,832,102 | 8/1974 | Alroy ................................ | 425/292 |
| 4,048,781 | 9/1977 | Johansen ........................... | 264/551 |
| 4,105,736 | 8/1978 | Padovani ........................... | 264/551 |
| 4,170,621 | 10/1979 | Kiefer ................................ | 425/412 |
| 4,191,520 | 3/1980 | Kiefer ................................ | 425/387.1 |

FOREIGN PATENT DOCUMENTS

7015773 4/1970 Fed. Rep. of Germany .
2011089 9/1970 Fed. Rep. of Germany .
2123916 11/1972 Fed. Rep. of Germany .
1276900 1/1973 Fed. Rep. of Germany .
2319130 10/1974 Fed. Rep. of Germany .
2517981 11/1976 Fed. Rep. of Germany .
2918694 11/1979 Fed. Rep. of Germany .
2716680 12/1979 Fed. Rep. of Germany .

*Primary Examiner*—Willard E. Hoag
*Attorney, Agent, or Firm*—Spencer & Frank

[57] ABSTRACT

Apparatus for shaping and cutting articles from a thermoplastic sheet and for stacking the articles in a stacking chute. A transporting device advances the sheet through the apparatus. The sheet is heated as it advances through the apparatus. A table is located downstream of the heater in the direction of advance of the sheet and is movable between a first position for shaping and cutting the articles and a second position for stacking the articles. A bearing pin is operatively associated with the table so that the table can be displaced by and pivoted about the bearing pin. A first guide device is mounted for being displaced perpendicular to the direction of advance of the sheet, with the bearing pin being seated in the first guide device. A bell crank drive is connected to the table via an articulated connection with the bearing pin for moving the table between the first and second positions. A second guide device is connected to the table for causing the table to pivot about the bearing pin to place the table in the second position after the table has moved toward the first position along a linear path perpendicular to the direction of advance of the sheet. An ejection device is provided for transferring the shaped and cut articles into the stacking chute when the table is in the second position.

6 Claims, 11 Drawing Figures

APPARATUS FOR SHAPING AND CUTTING A THIN THERMOPLASTIC SHEET TO MAKE ARTICLES AND FOR STACKING THE ARTICLES

BACKGROUND OF THE INVENTION

The present invention relates to an apparatus for shaping and cutting a thin thermoplastic sheet to make articles and for stacking the articles. The apparatus includes a heating element, a transporting element and a shaping station equipped with a movable table. The shaping station includes a combined shaping and cutting tool which, for the sake of simplicity, will be hereinafter referred to as the shaping tool. The lower portion of the shaping tool, which is mounted on the table, can be pivoted from a first position in which the shaping and cutting takes place, into a second position from which the stacking occurs. In that position, the articles are ejected into stacking troughs.

One problem in connection with a fast moving device which shapes and cuts articles made of a thin plastic sheet in one station is that the articles must be stacked when they are ejected from the mold nest. It is desirable to transfer the articles from the mold directly into stacking troughs, i.e. to not blow them out in an unordered fashion and then sort them again. U.S. Pat. No. 4,191,520 discloses that with with flat parts the transfer may be accomplished by discharging the articles and stacking them toward the top. This possibility, however, does not exist for larger articles which require the use of stretching aids. In this latter case, German Offenlegungsschrift (Laid-Open Patent Application) No. 2,517,981 discloses displacing the entire upper tool portion. This results in several problems relating to the number of articles transferred per unit time, heating, tightness and removal of the upwardly discharged and stacked articles.

Proposals have also been made to arrange a plurality of lower tool portions so that they rotate on a carrier and to then turn them, as for example described in U.S. Pat. No. 3,802,819. The major drawback here is that a plurality of shaping tools are required which is very expensive, particularly because these lower portions must all be exactly alike since they coact with the same matrix in the upper portion.

German Utility Model Pat. No. 70 15 773 discloses pivoting of the lower portion of a shaping tool toward the stacking station by 180° after the shaping step. The drawback here is that the long path to be traversed by the shaping tool results in a low output of the device, and the energy requirement of the device is high. Moreover, the closing movement of the tool halves (for cutting) must here be effected by moving the upper portion of the shaping tool. Thus, two drives must be provided, namely one for the upper portion and one for the lower portion, and these drives must be accurately synchronized with one another's functions, which at the high output numbers required can be accomplished only in a positive mechanical way. Such a drive is complicated and expensive.

In the apparatus according to German Pat. No. 1,276,900, the lower portion of the shaping tool is pivoted about 90°. The structural design of the apparatus does not permit a pivot angle of less than about 90°. The drawback here is that the lifting movement for cutting is effected directly by way of a cam disc and therefore the cam roller must absorb the entire cutting force. The design of the apparatus does not permit the use of a bell crank drive. Another drawback is that the upper portion and the lower portion of the shaping tool cannot be guided relative to one another, for example, by means of guide column. The reason for this is that the lower portion performs only a pivoting movement and a very slight vertical lifting movement for cutting. The consequence of omitting such a guide is rapid wear of the cutting edges.

SUMMARY OF THE INVENTION

It is an object of the present invention to design an apparatus of the above described type so that during opening (i.e., top and lower portions spreading apart) the lower portion is initially shifted axially over a certain path with respect to the upper portion and then, during the further opening movement, the lower tool porton is tilted, with the pivot angle lying, depending on the configuration of the device, at 30° to 90°. During closing of the tool the procedure is reversed. This provides good guidance of the two tool halves with respect to one another. The closing and opening movement preferably takes place over a bell crank drive which permits high closing and cutting forces.

The above and other objects are accomplished by the invention wherein a novel apparatus is provided for shaping and cutting articles from a thermoplastic sheet and for stacking the articles in a stacking chute. The apparatus includes a transporting means for advancing the sheet through the apparatus and heating means for heating the sheet as the sheet advances through the apparatus. A table is located downstream of the heating means in the direction of advance of the sheet and is movable between a first position for shaping and cutting the articles and a second position for stacking the articles. A bearing pin is operatively associated with the table so that the table can be displaced by and pivoted about the the bearing pin. A first guide means is mounted for being displaced perpendicular to the direction of advance of the sheet, wherein the bearing pin is seated in the first guide means. A bell crank drive is connected to the table via an articulated connection with the bearing pin for moving the table between the first and second positions. A second guide means is connected to the table for causing the table to pivot about the bearing pin to place the table in the second position after the table has moved toward the first position along a linear path perpendicular to the direction of advance of the sheet. An ejection means is provided for transferring the shaped and cut articles into the stacking chute when the table is in the second position.

It is desirable, moreover, to design the apparatus so that it can be easily modified to allow only an axial movement to take place without any pivoting movement, thus enabling the apparatus to be operated in the conventional manner or only for shaping. This permits use of the apparatus also to the extent that already existing tools can be employed which are provided for strictly linear opening movements.

DESCRIPTION OF THE PREFERRED EMBODIMENTS

Figure 1:
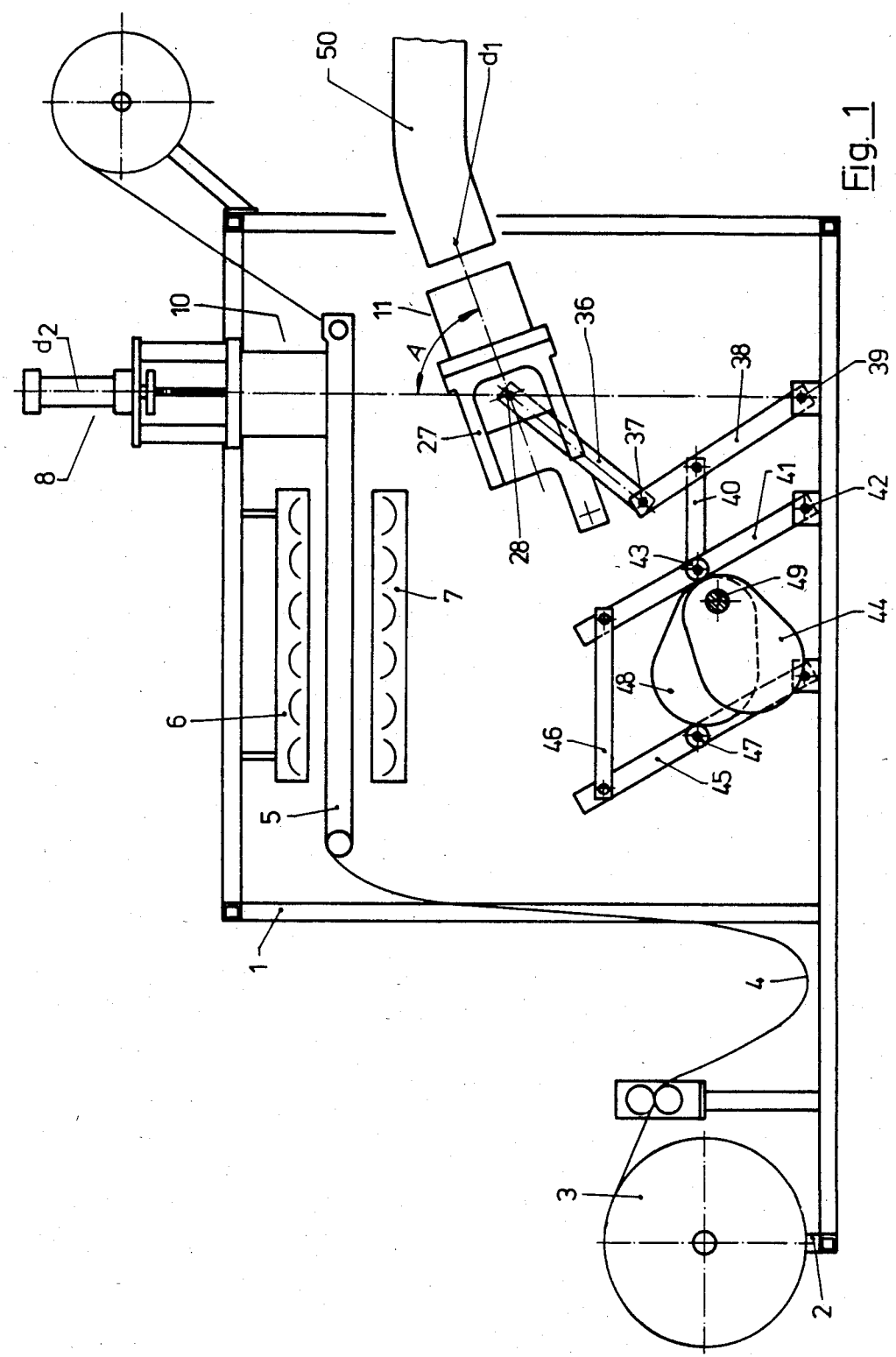
FIG. 1 is a schematic side view of the apparatus according to the invention.

Referring to FIG. 1, the essential parts of the apparatus are accommodated in a stand 1, with a reel holder 2 adjacent the entrance of stand 1. A thin sheet 4 of thermoplastic material is removed from reel 3 and is transported intermittently through the apparatus by transporting device 5, which may comprise, for example, rotating chains equipped with sprockets. Heating elements 6, 7 are arranged at both sides of thin sheet 4. A shaping station 8 is next in the direction of travel of sheet 4. In shaping station 8, the articles 9 to be produced are shaped by pressure differences and are cut out of the length of sheet 4.

Figure 2:
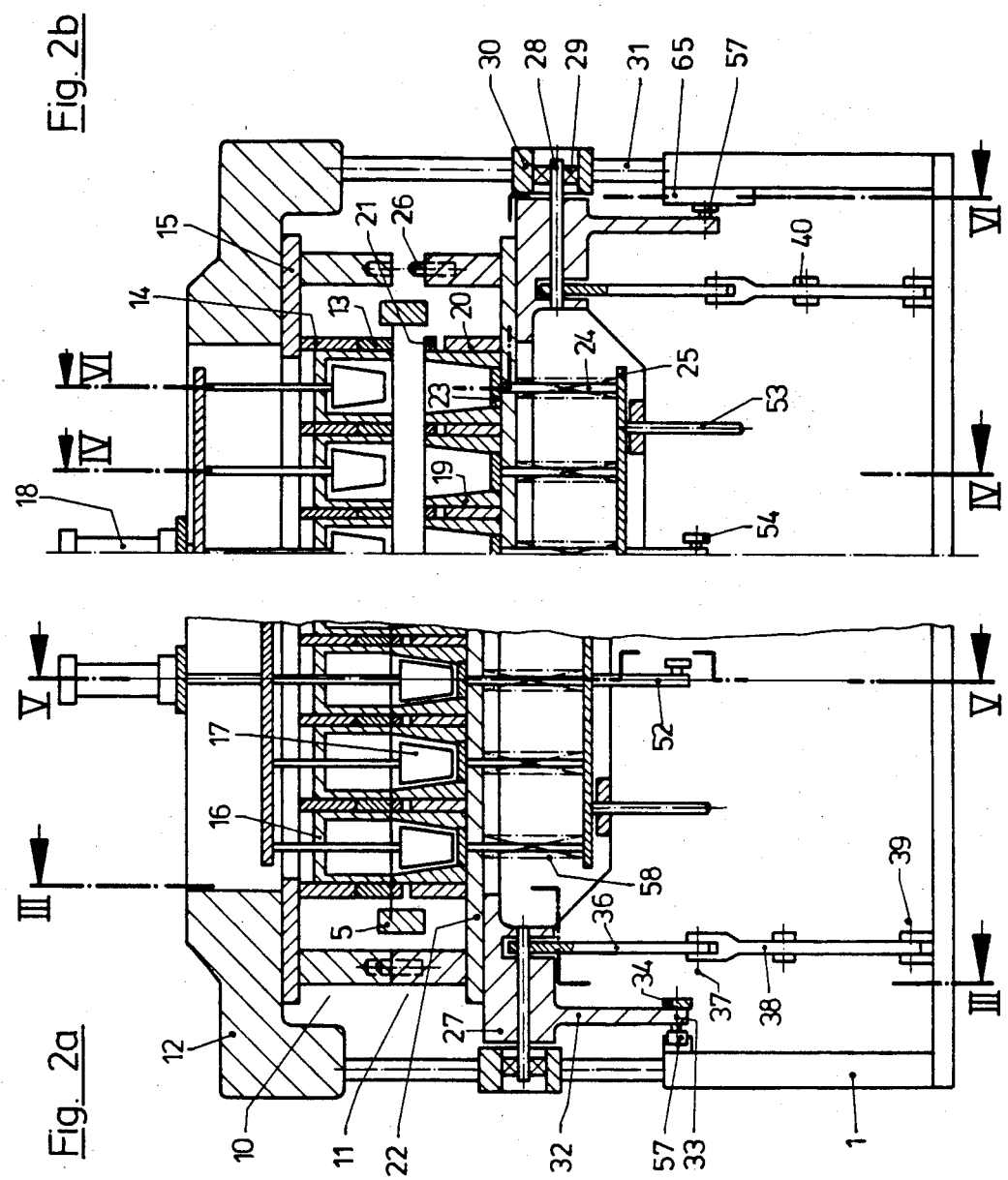
FIG. 2a is a partial sectional side view of the shaping station in a closed position and partially illustrating one preferred embodiment of the invention in which the shaping table is pivoted by means of levers and a cam disc.
FIG. 2b is a partial sectional side view of the shaping station in a partially open position and partially illustrating another embodiment of the invention in which the shaping table is pivoted by means of a connecting member.

Referring also to FIGS. 2a and 2b, shaping station 8 contains a shaping tool which includes an upper portion 10 and a lower portion 11, with the upper portion 10 being mounted to a rigid transverse bridge 12. The latter can be adapted in height, by means of an adjustment device (not shown), to the height of the shaping tool when the apparatus is set up. Upper portion 10 is formed by female element 13, intermediate plate 14, head plate 15, individual depressors 16 and stretching aids 17. The latter are moved by drive 18.

Lower portion 11 is formed by mold insert 19, cooling block 20, stripper 21, base plate 22 and shaping bottoms 23, which are connected with a plate 25 by means of rods 24 so as to be adjustable in height.

During their relative vertical movements, upper portion 10 and lower portion 11 are guided over a short path by means of guide pins 26. Lower portion 11 is fastened to the height adjustable and pivotal table 27. In table 27, two bearing pins 28 are mounted which are seated at their outside ends in bearings 29. Each bearing 29 is fastened in a guide member 30 which itself is vertically displaceable at the stationary guide columns 31.

Referring initially to the embodiment depicted in FIG. 2a and FIGS. 3-6, pivoting of table 27 is here effected by a cam disc 62. In this case, two projections or tongues 32 project downwardly from table 27 as shown in FIGS. 2a and 2b, and two levers 34 each have one end articulated at a respective one of two pivot points 33.

Figure 3:
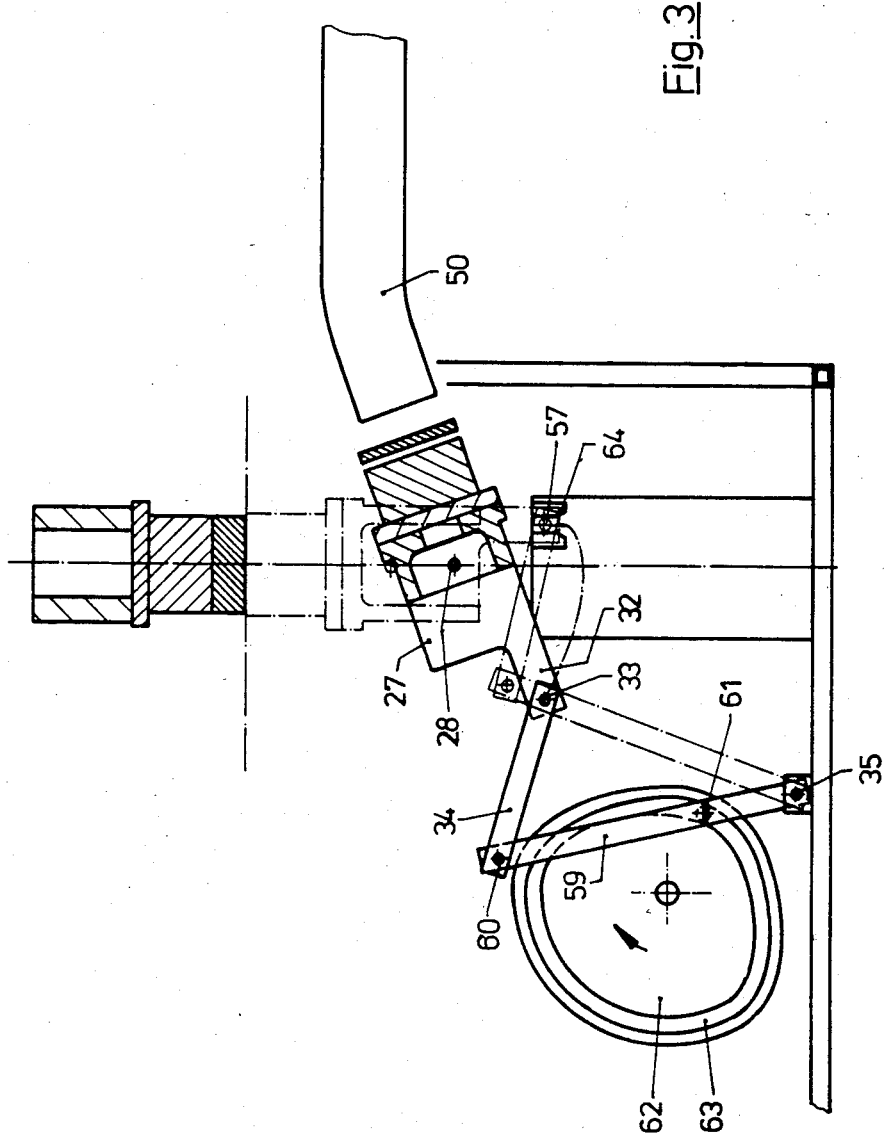
FIG. 3 is a partial schematic sectional side view along line III—III of FIG. 2a and shows additional components of the one preferred embodiment of the mechanism for pivoting the lower portion of the apparatus according to the invention.

As shown in FIG. 3, at their other end, each lever 34 is articulatedly connected at a pivot point 60 with a lever 59 which is itself pivotal about a pivot point 35. Each lever 59 is fastened to a cam roller 61 which is in communication with cam disc 62. The latter is provided with, for example, a circumferential groove 63 in which cam roller 61 is seated.

In an advantageous manner, stationary, short guide members 64 are mounted at stand 1 and a cam roller 57 is mounted in the pivot point 33 opposite each lever 34. During the brief horizontal movement of table 27, cam rollers 57 travel in guide members 64 so as to provide a more accurate guide compared to the pure movement by way of the levers 34, 59.

Referring again to FIGS. 1, 2a and 2b, bearing pins 28 preferably serve as points of articulation at one end of levers 36. The opposite end of levers 36 is connected with levers 38 at pivot point 37. Levers 38 are mounted at pivot point 39 to stand 1. A transverse lever 40 connects levers 38 with lever 41 which is pivotally mounted at pivot point 42 and on which is seated a cam roller 43. The latter is driven by a cam disc 44 which is moved at a settable speed relative to major shaft 49 by a regulating gear (not shown).

A cam roller 47 is seated at a second lever 45 which is connected with lever 41 by way of levers 46, with which a cam disc 48 cooperates. The latter is also seated on major shaft 49. Thus, both levers 36 and 38 are moved by way of these two cam discs 44 and 48 between the stretch (closed) position (FIG. 2a) and the open position (FIG. 1). In this way, a bell crank is formed which provides a high closing force and wherein cam roller 43 is itself only slightly charged.

Preferably, cam discs 62 (FIG. 3) are either seated on the same main shaft 49 as cam discs 44 and 48 (FIG. 1) so as to move table 27 or they are seated on a synchronously driven shaft.

In the above-described design of the apparatus, the center axis $d_1$ (FIG. 1) of lower portion 11 is able to form an angle "A" between 45° and 90° with the center axis $d_2$ of shaping station 8. In this position, a stacking chute 50 equipped with retention members 51 (shown in FIG. 5) is provided opposite mold inserts 19.

The devices for ejecting articles 9 in this embodiment will be described with the aid of FIGS. 2a, 2b and 4 to 6.

Figure 4:
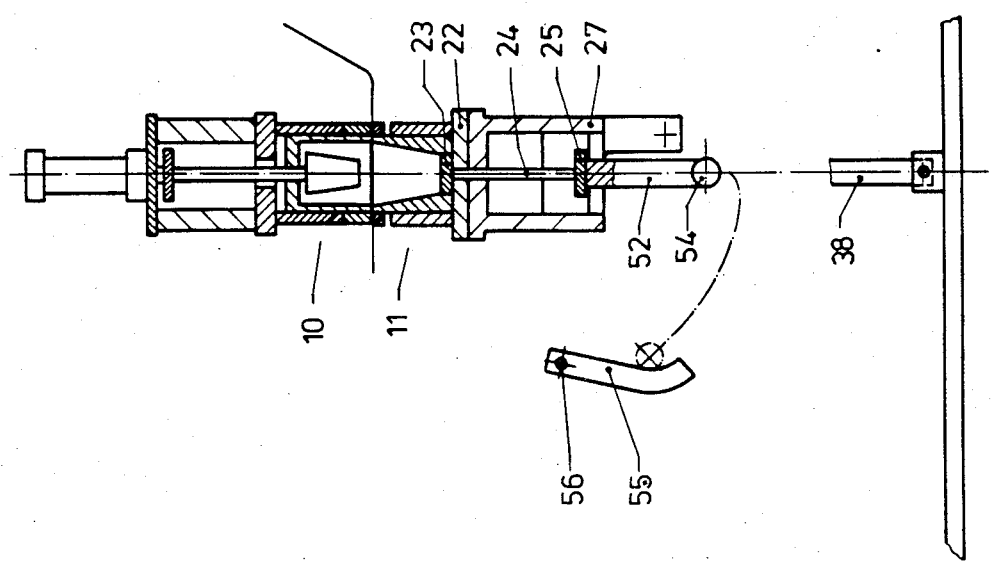
FIGS. 4 to 6 are partial sectional side views along line V—V of FIG. 2a for the embodiment of FIG. 3 in various phases of the stacking process.
Figure 5:
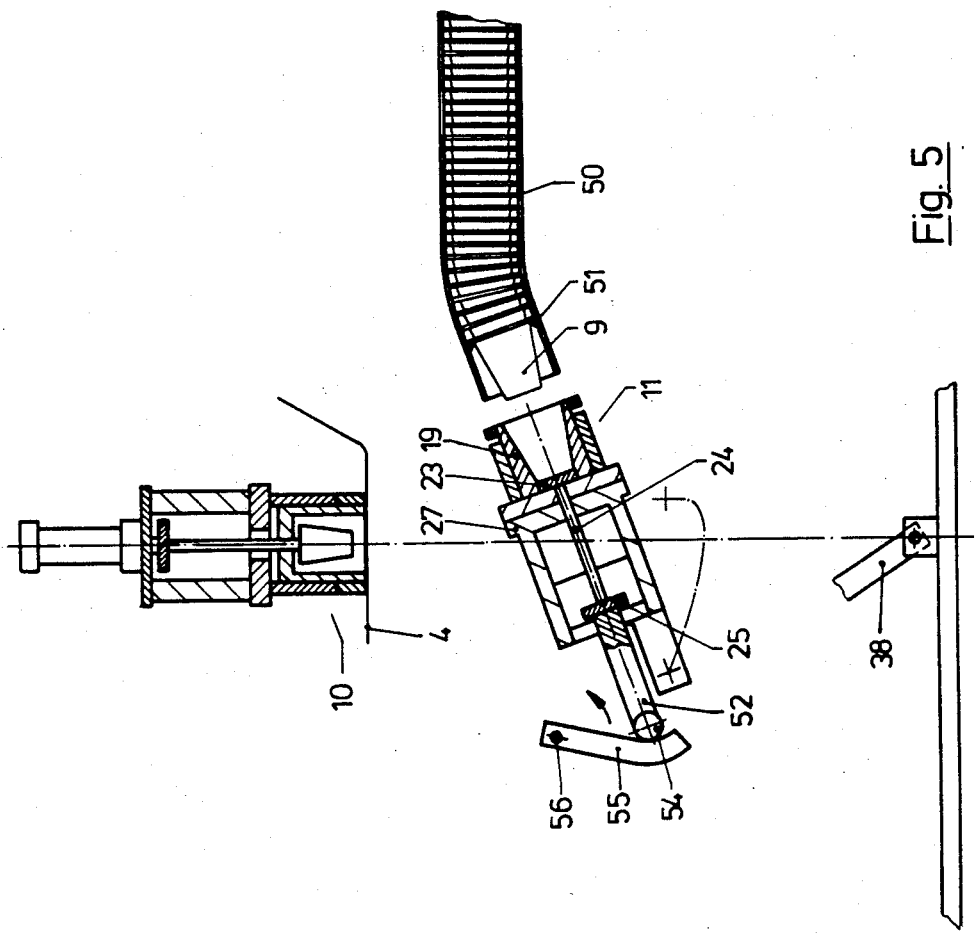
Figure 6:
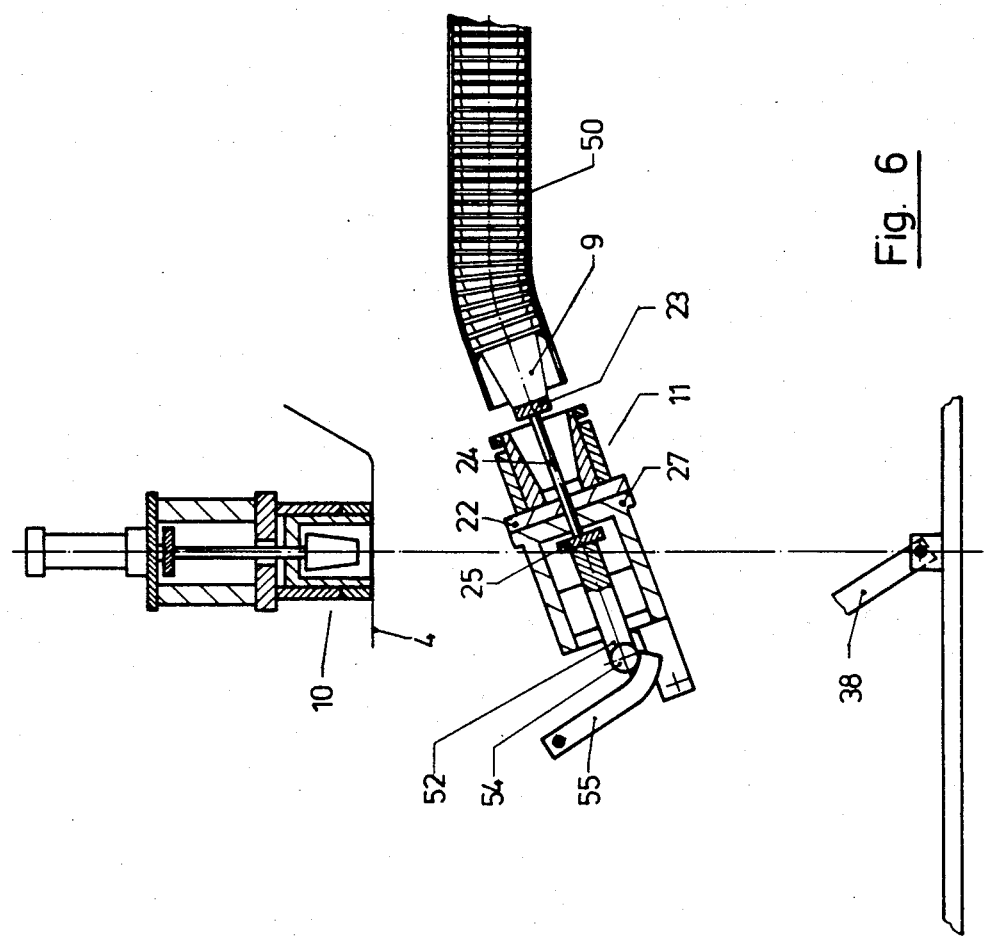
Figure 7:
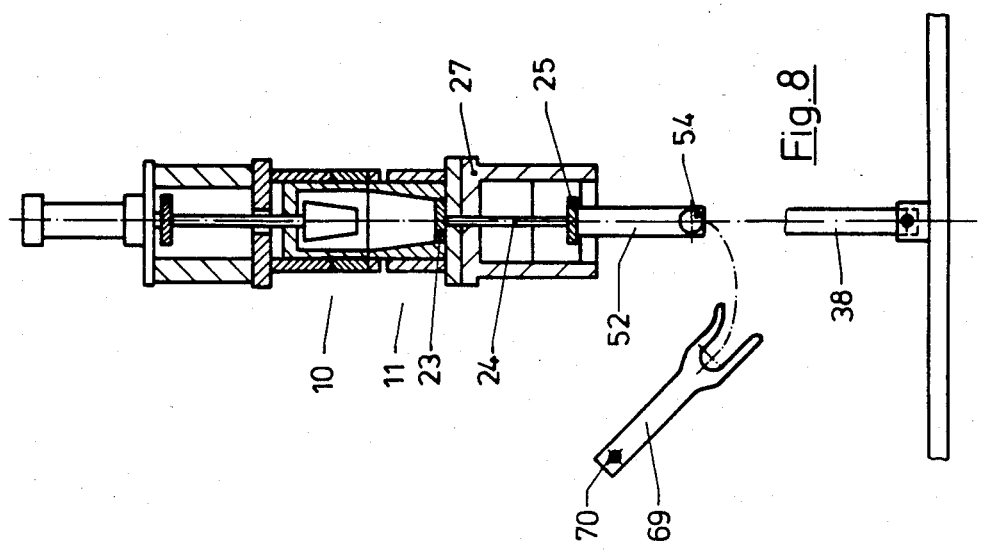
FIG. 7 is a partial sectional side view along line VI—VI of FIG. 2b and shows additional components of the other preferred embodiment of the mechanism for pivoting the lower portion of the apparatus according to the invention.
Figure 8:
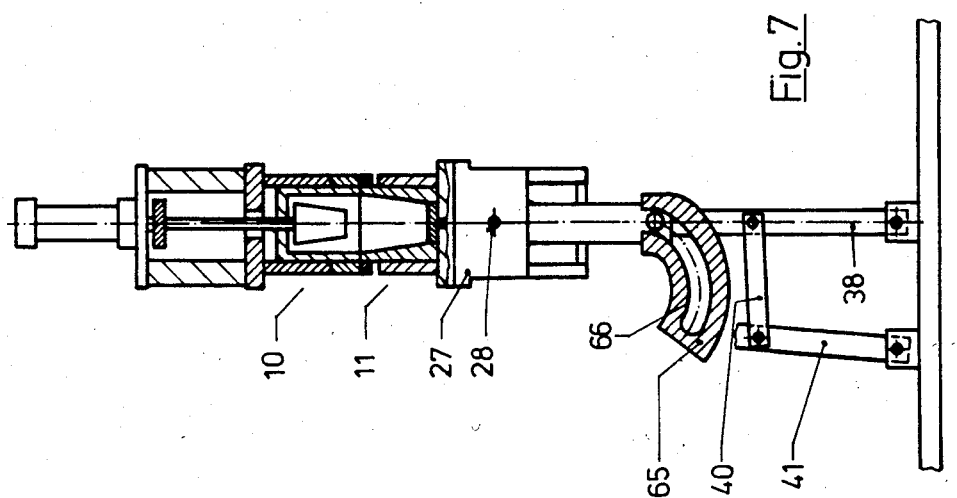
FIGS. 8-10 are partial sectional side views along line IV—IV of FIG. 2b and show additional components for the embodiment according to FIG. 7 in various phases of the stacking process.

Initially, a web 52 is fastened to plate 25. The height adjustable plate 25 is guided easily by means of rods 53. At its lower end, web 52 is provided with a cam roller 54. The starting position after shaping and cutting of articles 9 is shown in FIG. 2a and in FIG. 4. When lower portion 11 is lowered and pivoted, cam roller 54 performs approximately the path shown by dot-dash lines in FIG. 4. In its end position cam roller 54 abuts on ejector 55 which is designed to be pivotal about pivot point 56. Due to the pivoting of ejector 55, mold bottoms 23 are raised and articles 9 are transferred to stacking troughs 50. The pivoting movement of ejector 55 is appropriately performed by way of a cam disc (not shown) in synchronism with the other two cam discs 44 and 48. The return movement of plate 25 is effected by springs 58 (shown in FIGS. 2a and 2b). FIGS. 4 to 6 show this embodiment of the ejector device in various phases of the stacking process.

Now follows the description of another embodiment in which the pivoting movement of table 27 is positively enforced by way of two connecting members, only one of which is shown in FIGS. 2b and 7 to 10. In this case, cam rollers 57 each move in a connecting member 65 which is stationarily mounted at stand 1.

Figure 9:
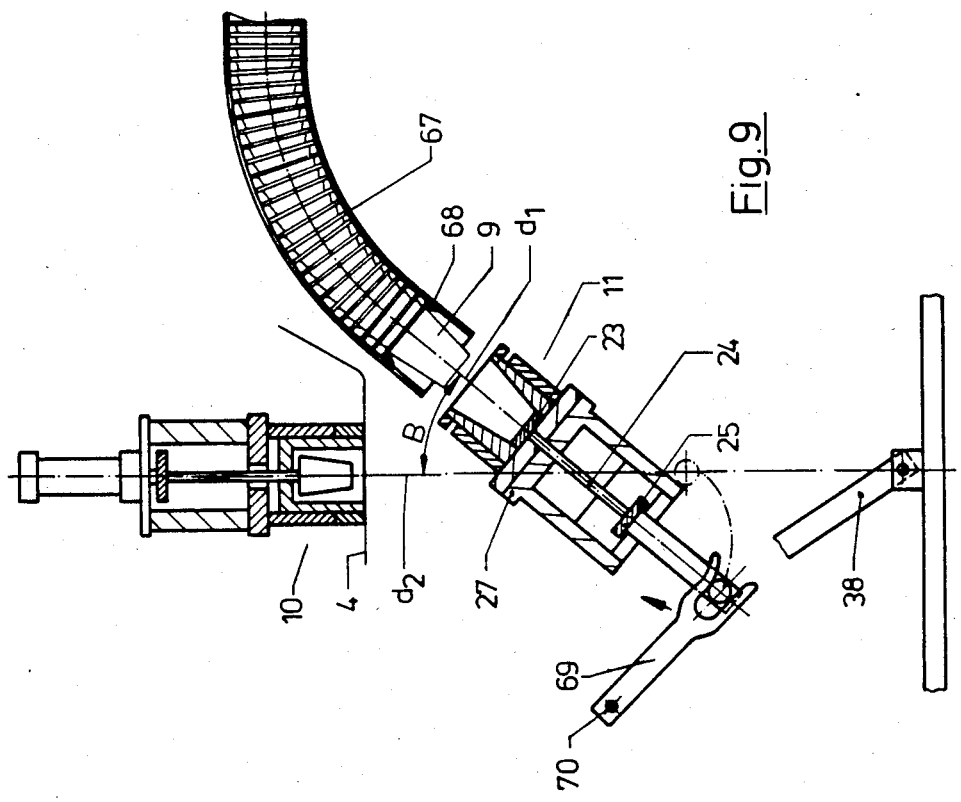
Figure 10:
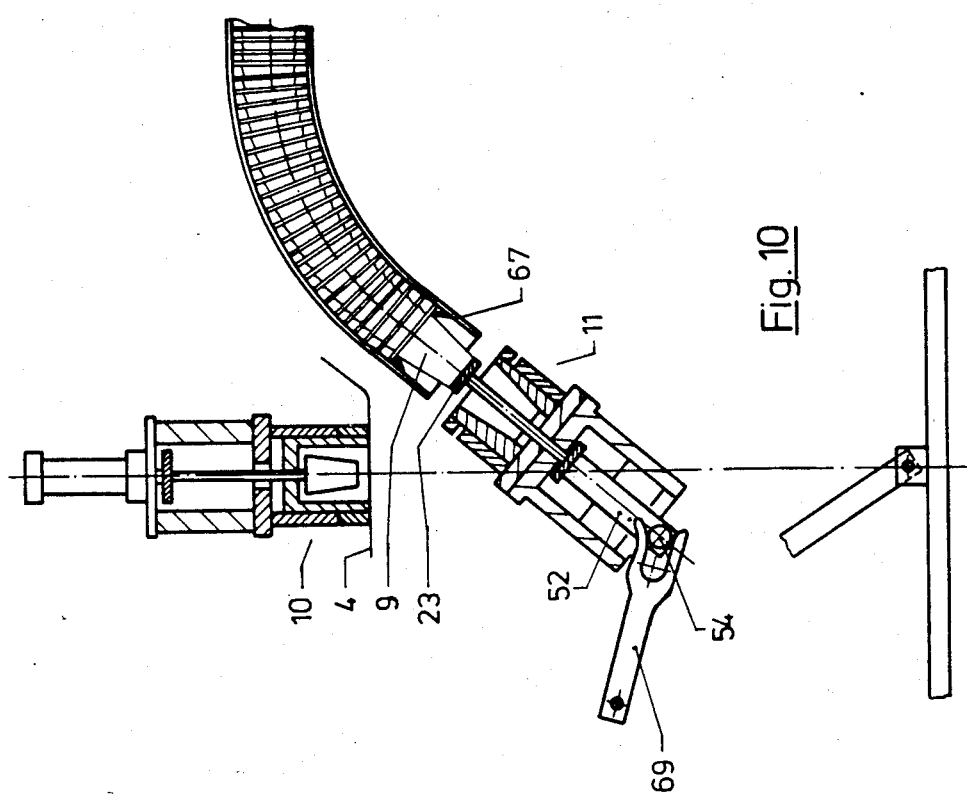

A crank path 66 in each connecting member 65 is in the axial direction of the apparatus in a first section and then changes into a curved portion in a second section. The shape of path 66 can be seen in FIG. 7. In this case, table 27, after a brief axial movement, pivotes about an angle "B" of about 30° to 50° between axes $d_1$ and $d_2$ as shown in FIG. 9. In this position, a stacking chute 67 equipped with retention members 68 is disposed opposite mold inserts 19.

Ejection of the articles is again effected via cam roller 54 which is fastened to web 52. In the embodiment of the ejection device shown in FIGS. 8 to 10, a fork 69 is provided for displacement and this fork 69 is pivotal about a pivot point 70. The pivoting movement of fork 69 is appropriately effected by means of a cam disc (not shown), in synchronism with the other two cam discs 44 and 48.

The apparatus operates as follows:

A piece of the thin thermoplastic sheet 4 transported into shaping station 8 is drawn down in a known manner by a difference in pressure (see FIG. 2a) and is then cut out by a brief upward movement of lower portion 11. There then begins a short axial downward movement of table 27, brought about by the corresponding shape of the cam path of cam disc 62 and possibly supported by guide members 64 or enforced by the shape of crank path 66. During the further downward movement of table 27 due to corresponding movement of the bell crank formed by sprockets 36 and 38, sprockets 59 are pivoted over two cam discs 62 so that table 27 is tilted until it reaches the position shown in FIG. 3, or crank path 66 forces a tilting movement into the position shown in FIG. 9. Then, articles 9 are ejected into stacking chute 50, 67 and table 27 is elevated.

It is possible, by installing a long guide member which has a linear crank path in place of connecting member 65 and possibly after unlatching of sprockets 34, to obtain only an axial movement of table 27 as would be desirable for a shaping-only operation or when already existing tools are used.

It will be understood that the above description of the present invention is susceptible to various modifications, changes and adaptations, and the same are intended to be comprehended within the meaning and range of equivalents of the appended claims.

What is claimed is:

1. In apparatus for shaping and cutting articles from a thermoplastic sheet and for stacking the articles in a stacking chute, the improvement comprising:

transporting means for advancing the sheet through said apparatus;

heating means for heating the sheet as the sheet advances through said apparatus;

a table for supporting a cutting and shaping means located downstream of said heating means in the direction of advance of the sheet and which is movable between a first position for shaping and cutting the articles and a second position for stacking the articles;

a bearing pin operatively associated with said table so that said table can be displaced by and pivoted about said bearing pin;

first guide means mounted for being displaced perpendicular to the direction of advance of the sheet, said bearing pin being seated in said first guide means;

a bell crank drive connected to said table via an articulated connection with said bearing pin for moving said table between said first and second positions;

second guide means connected to said table for causing said table to pivot about said bearing pin to place said table in said second position after said table has moved toward said first position along a linear path perpendicular to the direction of advance of the sheet; and an ejection means for transferring the shaped and cut articles into the stacking chute when said table is in said second position.

2. Apparatus as defined in claim 1, wherein said table has a pivot point located below said bearing pin and said second guide means includes:

a lever having one end articulated to said table at said pivot point; and a cam disc arranged for moving said lever so that said table pivots about said bearing pin through an angle of 45° to 90°.

3. Apparatus as defined in claim 2, wherein said second guide means further includes a stationary guide member and a guide roller fastened to said table at said pivot point, said guide roller operatively cooperating with said guide member so that said guide roller is guided by said guide member during a portion of the movement of said table.

4. Apparatus as defined in claim 1, wherein said second guide means includes a stationary connecting member having a crank path which has a linear section and a curved section, and a cam roller fastened to said table and arranged to move in said crank path.

5. Apparatus as defined in claim 4, wherein said crank path is curved so that said table is pivotable about said bearing pin by an angle of about 45°.

6. Aparatus as defined in claim 1, wherein said bell crank drive includes a lever connected to said table via said bearing pin and said bearing pin is the fulcrum for the pivoting movement of said table.

* * * * *